United States Patent
Grabau

(10) Patent No.: US 9,051,917 B2
(45) Date of Patent: Jun. 9, 2015

(54) WIND TURBINE BLADE

(75) Inventor: Peter Grabau, Kolding (DK)

(73) Assignee: Envision Energy (Denmark) ApS, Silkeborg (DK)

(*) Notice: Subject to any disclaimer, the term of this patent is extended or adjusted under 35 U.S.C. 154(b) by 543 days.

(21) Appl. No.: 13/524,066

(22) Filed: Jun. 15, 2012

(65) Prior Publication Data

US 2012/0321471 A1 Dec. 20, 2012

(30) Foreign Application Priority Data

Jun. 15, 2011 (DK) .................... 2011 70303

(51) Int. Cl.
| | |
|---|---|
| F03D 11/00 | (2006.01) |
| F03D 7/02 | (2006.01) |
| F03D 1/00 | (2006.01) |
| F03D 1/06 | (2006.01) |

(52) U.S. Cl.
CPC .............. *F03D 7/0228* (2013.01); *F03D 1/001* (2013.01); *F03D 1/0675* (2013.01); F05B 2230/60 (2013.01); F05B 2240/302 (2013.01); F05B 2260/301 (2013.01); F05B 2260/79 (2013.01); Y02E 10/721 (2013.01); Y02E 10/723 (2013.01); Y02E 10/728 (2013.01)

(58) Field of Classification Search
CPC ..... F03D 1/003; F03D 1/0675; F03D 7/0224; F03D 7/0228; F03D 11/0008; F05D 2240/302; F05D 2260/74; F05D 2260/79

USPC ........................................................ 416/155
See application file for complete search history.

(56) References Cited

U.S. PATENT DOCUMENTS

| | | | |
|---|---|---|---|
| 4,575,309 A | 3/1986 | Brown | |
| 7,994,650 B2* | 8/2011 | Stommel | 290/44 |
| 8,834,100 B2* | 9/2014 | Nunez Polo et al. | 415/122.1 |
| 2009/0016885 A1* | 1/2009 | Bech | 416/155 |
| 2012/0134809 A1* | 5/2012 | Bagepalli et al. | 416/1 |

FOREIGN PATENT DOCUMENTS

| | | |
|---|---|---|
| CN | 101451491 A | 6/2009 |
| EP | 1 741 940 A1 | 1/2007 |
| WO | 2005/019642 A1 | 3/2005 |
| WO | 2011/056121 A1 | 5/2011 |

* cited by examiner

*Primary Examiner* — Ninh H Nguyen
(74) *Attorney, Agent, or Firm* — Roberts Mlotkowski Safran & Cole, P.C.; David S. Safran

(57) ABSTRACT

A wind turbine blade is described having a pitch system coupling which is adapted to allow fasteners, such as bolts, of such a coupling to be tightened from the inside of the blade. This removes the need for relatively difficult and expensive external maintenance operations to tighten pitch coupling bolts. The coupling is arranged to present first and second internal bearing surfaces, against which the bolts of the pitch coupling can be tightened. The coupling may comprise a shaped end portion of an inner blade section, and/or the pitch system may comprise an additional bolting collar to facilitate this arrangement.

14 Claims, 5 Drawing Sheets

WIND TURBINE BLADE

BACKGROUND OF THE INVENTION

1. Field of the Invention

The present invention relates to fastening of an inner blade section and outer blade section to a pitch system of a partial pitch wind turbine blade, in particular to the bolting connection.

2. Description of Related Art

In certain wind turbine blade designs, it is desired to be able to pitch some or all of the wind turbine blade body for controlling wind turbine operation. Such pitching is accomplished through use of a pitch system provided between the turbine sections desired to pitch.

With reference to FIG. 1, a cross-sectional illustrative example of a pitch system coupling installed in a wind turbine blade is indicated by 50. Only one side of the pitch system 50 is shown in cross-section in FIG. 1—it will be understood that the entire pitch system 50 continues in a complete circle, constituting an entire pitchable coupling between adjacent blade sections.

The pitch system 50 comprises first and second concentric pitch rings 52, 54 coupled to each other via at least one bearing runway 56. The first pitch ring 52 is an outer pitch ring having a relatively larger diameter than the second pitch ring 54, which is located within the circumference of the first pitch ring 52. The bearings in the runway 56 permit the first pitch ring 52 of the pitch system to rotate relative to the second pitch ring 54.

In FIG. 1, the first pitch ring 52 is coupled to a first blade section 58; a bolt 60 is extending through the first pitch ring 52 and securely received within the end portion of the first blade section 58; a nut 62 is applied to the free end of the bolt 60 for tightening against the first pitch ring 52 and the underlying end surface on the first blade section 58. Similarly, the second pitch ring 54 is coupled to a second blade section 64; a bolt 66 is extending through the second pitch ring 54 and securely received within the end portion of the second blade section 64; a nut 68 is applied to the free end of the bolt 66 for tightening against the second pitch ring 54 and the underlying end surface on the second blade section 64. Consequently, the second blade section 64 may be rotatably pitched relative to the first blade section 58.

As only one side of the pitch system 50 is shown in cross-section in FIG. 1, accordingly, it will be understood that a plurality of bolts 60, 66 and nuts 62, 68 are provided about the circumference of the pitch system 50.

As a result of the described configuration of pitch system 50, one set of a plurality of nuts and bolts are located on the exterior of the blade—in this case the first set of nuts and bolts 60, 62. This configuration is the standard arrangement for full-pitch wind turbine rotor blades (where the pitch ring is provided at the root end of the rotor blade), for example as seen in U.S. Pat. No. 6,783,326. Similarly, the arrangement of one set of nuts and bolts on the exterior of the wind turbine blade is also used for partial pitch rotor blades, where the pitch system is located at a point on the longitude of the entire rotor blade between a first blade section and a second blade section.

One problem with such an arrangement, however, is that any maintenance of the bolting connection of the first pitch ring 52 requires external blade access to correctly position a worker to perform suitable maintenance operations, e.g. tightening of the bolt connections. Such external blade access results in considerable maintenance time and cost, as blade rotation must be securely and safely stopped. Furthermore, in the case of partial pitch turbines a gantry or crane-hoisted platform must be positioned adjacent the pitch junction of the blade under maintenance. In the case of off-shore turbines, such maintenance operations involve additional costs, as any external maintenance operations are more susceptible to weather delays, etc. As a maintenance operation, such as bolt tightening, must be performed regularly during the lifetime of a wind turbine, the costs involved in such maintenance operations represent a considerable operational expense for such wind turbines.

In International patent application WO 2005/019642, a wind turbine blade pitch system is disclosed and illustrated by a blade mounted rotatably to the hub. The connection between the blade and the hub is made through a pitch drive disc. This disc is mounted to the blade by bolts that extend into the blade. Between the hub and the disc, there are provided other bolt systems that extend through the disc and through a wall of the hub. The disclosure also contains an illustration of a pitch system between two parts of a blade. No information is given, how these bolts are fastened. Also, International patent application WO 2011/056121 discloses a wind turbine with a pitch system between two parts of a blade.

It is an object of the invention to improve the prior art systems. Especially, it is an objective to provide a wind turbine blade which overcomes the problems outlines above and results in a reduction in associated maintenance costs.

SUMMARY OF THE INVENTION

This objective is achieved by a method, where the inner and outer blade sections of a partial pitch wind turbine blade are fastened to each other through a pitch system by a fastening action that is performed from only inside the blade, typically a blade of at least 35 metres length where the blade has a substantially hollow blade body. In connection with the pitch system that is provided between the inner and outer blade section, the inner blade section is fastened to the pitch system by a fastening action performed only from inside the blade, for example the inside of the inner blade section. Likewise, the outer blade section can be fastened to the pitch system by a fastening action performed only from inside the blade.

Advantageously, the blade and method comprises the following detailed constructional details and steps. There is provided a partial pitch wind turbine blade having a substantially hollow body, an inner blade section and an outer blade section and a pitch system between the inner and outer blade section for pitching the outer blade section relatively to the inner blade section. The pitch system comprises first and second pitch rings, the second pitch ring being rotatable relative to the first pitch ring. The inner blade section comprises a root end and a first pitch end; the first pitch end being configured for coupling to the first pitch ring by a first plurality of fasteners; the first plurality of fasteners having first means for securing the first plurality of fasteners, the first means being configured such that only securing of the first means fastens the first pitch end to the first pitch ring; the first means being only accessible from an interior of the wind turbine blade and configured for fastening the inner blade section to the first pitch ring by the first means only from the interior of the wind turbine blade. The outer blade section comprises a second pitch end and a tip end; the second pitch end being configured for coupling to the second pitch ring of the pitch system by a second plurality of fasteners; the second plurality of fasteners having second means for securing the second plurality of fasteners, the second means being configured such that securing of the second means fastens the second pitch end to the second pitch ring; wherein the second means are only accessible from an interior of the wind turbine blade. The method comprises fastening the second pitch end to the second pitch ring by securing said second means only from the interior of said wind turbine blade. Further, the method comprises fastening the first pitch end to the first pitch ring by securing said first means only from the interior of said wind turbine blade.

Thus no fastening action has to be performed from outside the blade, once the inner and outer blade and the pitch system have been brought into proper contact for fastening with the fasteners.

In this respect, the term securing means a securing action performed only from the interior of the blade body. For example, the term securing means tightening a bolt, with or without a nut, against a surface.

Typically, the first plurality of fasteners comprises a plurality of first bolts and first nuts, wherein the first means are the first nuts interacting with the bolts. Normally, the bolts are straight pieces with a winding, one end of which is fastened to a blade section and the other end is secured by the nut. Alternatively, the fasteners comprises bolts with a screw head, and the means for fastening is the screw head that has to be turned by appropriate machinery in order to secure the bolt with the head by the turning action into a corresponding screw hole with an inner winding. Correspondingly, the second plurality of fasteners comprises second bolts and second nuts, and the second means are the second nuts.

For example, the first pitch end comprises a first bearing surface on an interior of the inner blade section, wherein the first bearing surface abuts the first pitch ring and is fastening to it by the first fasteners. Possibly, first pitch end has an inner flange, the inner flange comprising the first bearing surface, and the first pitch ring of the pitch system is fastened to the first bearing surface of the inner flange by the first plurality of fasteners.

In case that the fasteners are bolts and nuts, optionally, the first bolts extend through the first pitch ring and into the first pitch end. This way, the first means and the first bearing surface may then be provided on opposite sides of the first pitch ring. For example, the inner flange comprises a plurality of blind holes extending from the first bearing surface of the inner flange into the wind turbine blade body at the flange, wherein a first plurality of bolts extend through the first pitch ring into the blind holes.

In some embodiments, there is provided a partial pitch wind turbine blade having a substantially hollow body, the blade comprising:

a pitch system having first and second pitch rings, the second pitch ring rotatable relative to the first pitch ring;

an inner blade section having a root end and a pitch end, the pitch end of the inner blade section coupled to the first pitch ring of the pitch system by a first plurality of bolts; and an outer blade section having a pitch end and a tip end, the pitch end of the outer blade section coupled to the second pitch ring of the pitch system by a second plurality of bolts, the outer blade section pitchable relative to the inner blade section, wherein the blade presents a first bearing surface and a second bearing surface provided on the interior of the blade body, the blade arranged such that a first end of the first plurality of bolts and a first end of the second plurality of bolts are accessible from the interior of the wind turbine blade, wherein the first plurality of bolts may be tightened against the first bearing surface and the second plurality of bolts may be tightened against the second bearing surface, such that the first and second plurality of bolts may be tightened from the interior of the wind turbine blade body.

As bolts may be tightened from inside the blade, there is no need for relatively complicated tightening operations to be performed outside of the blade (e.g. providing gantries on the outside of the blade for operators to be positioned at the pitch junction). The bolts are tightened in position in the blade by applying a tightening moment to the first end of the first plurality of bolts and to the first end of the second plurality of bolts, the tightening moment applied from within the interior of the blade body. This tightening action may be performed at the ends by either tightening a nut at the ends or by turning a bolt-head, which tightens the head against a surface.

The bearing surface is understood to refer to a surface of the blade assembly against which the bolts may be tightened. It will be understood that the bolts may be tightened directly against such a surface, or may be tightened against a surface of an element which is clamped to the bearing surface, for example a pitch ring, the tightening force thereby transferred through the element to the underlying bearing surface. As the bearing surface is provided on the blade interior, this allows for the internal tightening operation.

Preferably, the pitch end of the inner blade section is shaped to present the first bearing surface against which an end of the bolts of the first plurality may be tightened, for example by using a nut or by a bolt-head.

The inner blade section, which normally comprises the external surface against which a set of bolts are tightened, is specifically shaped such that the tightening end of the bolts are positioned in the interior of the blade body.

Preferably, the inner blade section comprises an inner flange provided at the pitch end of the inner blade section, and wherein the first pitch ring of the pitch system is bolted to the inner flange.

The bolts are arranged such that they can be tightened against the inner flange, or against the pitch ring mounted to the flange, from the interior of the blade.

For example, the flange projects orthogonally from the inner surface of the body of the inner blade section, towards the central longitudinal axis of the inner blade section.

Advantageously, the first bearing surface is orthogonal to a longitudinal axis of the inner blade section.

Optionally, the blade comprises a plurality of blind holes provided in the inner flange, the blind holes extending from an inner bearing surface of the inner flange into the wind turbine blade body at the flange. A first plurality of bolts extend through the first pitch ring into the blind holes, wherein the first plurality of bolts are operable to be tightened against the first pitch ring to secure the first pitch ring to the inner bearing surface of the inner flange.

In this embodiment, the pitch system and the tightening ends of the bolts are provided on the interior of the inner blade section, the pitch system mounted to the inner bearing surface of the flange. Here, the pitch system may be brought up through the interior of inner blade section to be mounted in this position, or the pitch system may be provided in several parts (in order to fit through the pitch end of the inner blade section).

In this case, the bolts may comprise an anchor section to secure the bolts in place in the flange, and further comprise a nut or other suitable element which may be adjusted on a threaded section of the bolts to tighten against the pitch ring to secure the pitch ring between the nuts and the inner bearing surface of the flange. Preferably, the inner bearing surface is the surface of the flange provided at the pitch end of the inner blade section facing towards the root end of the inner blade section.

In the following, a number of alternative technical solutions are described.

In a first alternative embodiment, the blade comprises a plurality of through-going apertures provided in the inner flange, the apertures extending from an inner bearing surface of the inner flange to an outer surface of the inner flange, wherein the first plurality of bolts extend through the apertures of the inner flange and the first pitch ring to mount the first pitch ring to the inner flange, such that an end of the first plurality of bolts may be tightened against the inner bearing surface of the inner flange to secure the first pitch ring to the inner flange.

This embodiment covers where the pitch ring may be bolted to either side of the flange, using a nut and bolt combination. The pitch ring may be mounted to the inner bearing surface of the flange, or to the outer surface of the flange (i.e. the surface of the flange facing away from the root section of the inner blade section).

The plurality of bolts may comprise a plurality of bolted joints used to secure the inner and outer blade sections to the pitch system. The bolts may comprise a bolt head, preferably provided at the exterior surface side of the bolted joint, and a threaded portion provided at the interior surface side of the bolted joint, the bolts arranged to couple with corresponding adjustable nuts provided on the threaded portions to tighten the bolts in position. The bolt heads are arranged such that they are self-securing against the outer surface in order to prevent any fastening action from the outside.

In particular, the first end of the first plurality of bolts are arranged to couple with a corresponding first plurality of nuts, wherein the first plurality of nuts are operable to bear against the inner surface of the inner flange to secure the first pitch ring to the inner flange, wherein the first plurality of nuts may be tightened from the interior of the wind turbine blade.

In a further alternative embodiment, the inner blade section is tapered at the pitch end to provide an inclined inner wall at the pitch end, wherein the first pitch ring is mounted to the end surface of the substantially hollow wind turbine blade body at the pitch end of the inner blade section, and wherein the first plurality of bolts are adapted to be tightened against the inclined inner wall.

In this embodiment, the inner blade section comprises a relatively narrowed pitch end. The end surface is that surface of the inner blade section body which faces away from the root end of the blade section, along the longitudinal axis of the section.

Optionally, the blade further comprises a bolting collar, the bolting collar having a substantially wedge-shaped cross-section having an inclined surface, wherein the inclined surface of the bolting collar is adapted to abut the inclined inner wall of the pitch end of the inner blade section, and wherein the bolting collar presents a level interior bearing surface against which an end of the bolts of the first plurality may be tightened.

This embodiment provides use of a wedge-shaped collar to allow for secure bolting to the inclined inner surface at the pitch end of the inner blade section.

The bolting collar may be provided in pieces (to allow for collar to be easily placed in position inside the end of blade section). Further features may include, but are not limited to, any suitable combination of the following: wherein the pitch end of the outer blade sections is shaped to a relatively narrow diameter; wherein the pitch end of the inner blade section is substantially the same diameter as the first (or outer) pitch ring of the pitch system; wherein the second (or inner) pitch ring is mounted to the end surface of the pitch end of the outer blade section; wherein the pitch end of the outer blade section is preferably narrower than the pitch end of the inner blade section; wherein the first and second pitch rings are concentric, the first pitch ring having a greater diameter than the second pitch ring.

In a further alternative embodiment, the pitch system comprises a circular bolting collar projecting from the first pitch ring, the circular bolting collar adapted to couple with the pitch end of the inner blade section, wherein the circular bolting collar presents a collar internal bearing surface, the first plurality of bolts arranged to be tightened against the collar internal bearing surface to secure the first pitch ring to the pitch end of the inner blade section.

In this embodiment, the pitch system is adapted to provide a suitable bearing surface for the bolts, which is located on the interior of the overall blade, allowing for all of the bolts at the pitch junction to be tightened from the interior of the blade.

For example, the blade comprises at least one coupling projection provided at the pitch end of the inner blade section, the circular bolting collar arranged to couple with the at least one coupling projection, and wherein the first plurality of bolts are arranged to extend through the circular bolting collar and the at least one coupling projection to form a bolted joint to secure the first pitch ring to the pitch end of the inner blade section.

By adapting the pitch system to provide a changed bearing surface for the bolts, the system of the invention can be implemented in standard partial pitch blades without significant alterations needed for the existing blade section designs.

The coupling projection may project from the end surface at the pitch end of the blade inner section, and the circular bolting collar may be arranged to fit within the diameter of the coupling projection arrangement. Alternatively, the circular bolting collar may have at least one aperture defined in a surface of the circular bolting collar to receive the at least one coupling projection, or vice versa.

It will be understood that a further series of apertures may be defined in the circular bolting collar and the at least one coupling projection, the apertures aligning when the inner blade section is coupled to the first pitch ring to present a through-going bore or blind hole to receive the first plurality of bolts, to secure the pitch ring to the blade section.

In an alternative embodiment, the circular bolting collar may be fitted around the diameter of the at least one coupling projection arrangement, with the at least one coupling projection subsequently presenting an internal bearing surface against which the first plurality of bolts may be tightened.

Optionally, the use of the first plurality of bolts in this configuration presents a cross bolt type of bolted joint, i.e. wherein the bolt axis of the first plurality of bolts is orthogonal to the longitudinal axis of the blade. This presents an orthogonal bolting arrangement, wherein the second set of bolts coupling the pitch system to the outer blade section have a bolt axis substantially parallel to the central longitudinal axis of the blade. The first set of bolts are arranged such that the bolt axis of the first set is in a lateral direction to the central axis of the blade. This potentially provides a more compact bolt arrangement, with the adjustable ends of the first and second sets of bolts provided closely adjacent one another, yet acting in orthogonal directions.

The coupling projection may comprise a coupling collar, or a plurality of projecting members. Also, the coupling projection may be formed integrally with the pitch end of the inner blade section or may be at least one separate element received in the body of the blade section (e.g. it may comprise an expandable anchor element to secure the at least one separate element to the blade section).

In a further feature, an aerodynamic shell or fairing may be provided around the pitch junction to reduce aerodynamic losses due to the presence of a tapered section, a discontinuity between adjacent blade sections, a bolted joint; etc.

There is also provided a partial pitch wind turbine comprising a partial pitch wind turbine blade according to the any of the above-described inventive embodiments. Such a wind turbine may comprise a wind turbine tower, a nacelle provided at the top of the tower, a rotor hub provided at the nacelle, and at least two partial pitch wind turbine blades provided on the rotor hub. The turbine may be an on-shore or off-shore turbine.

Embodiments of the invention will now be described, by way of example only, with reference to the accompanying drawings, in which:

DETAILED DESCRIPTION OF THE INVENTION

Figure 1:
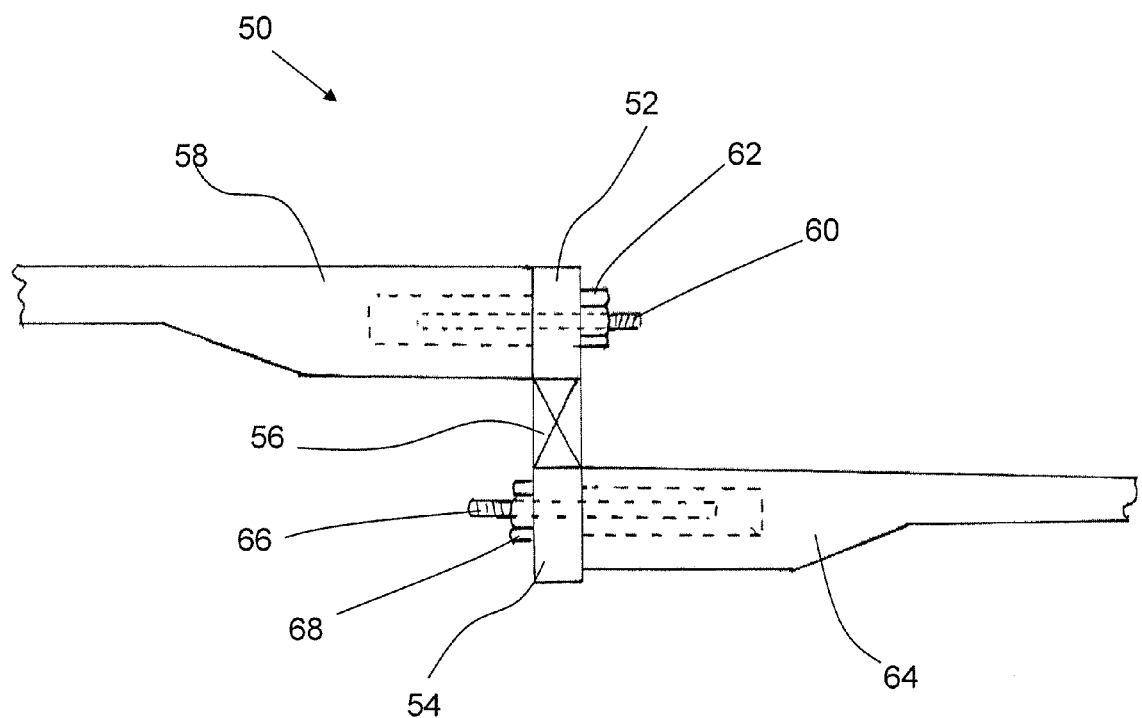
FIG. 1 is an enlarged cross-sectional view of a portion of a prior art pitch junction coupling.
Figure 2:
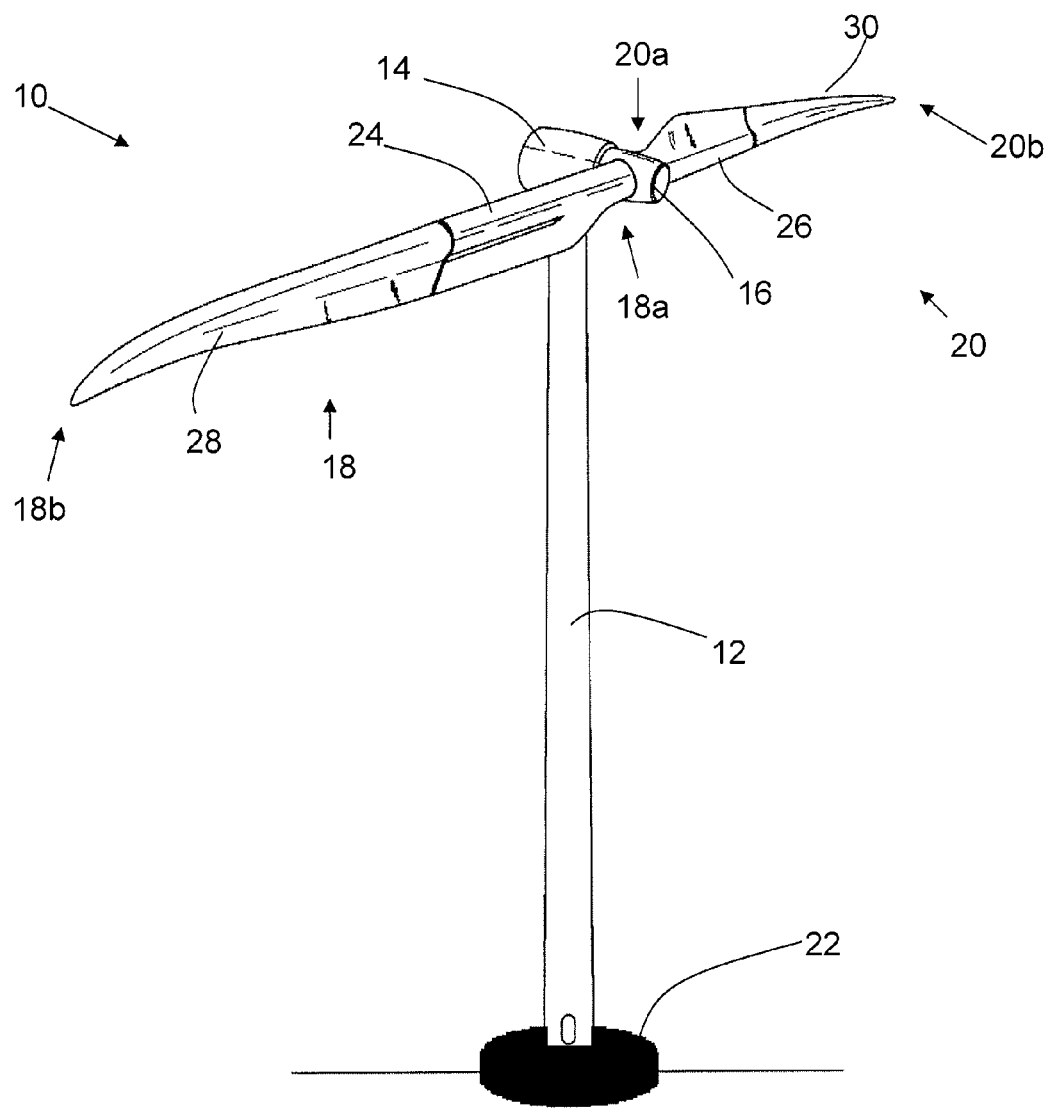
FIG. 2 is a perspective view of a two-bladed partial pitch wind turbine.

With reference to FIG. 2, a partial-pitch two-bladed wind turbine is indicated generally at 10. The wind turbine 10 comprises a wind turbine tower 12, a nacelle 14 provided at the top of the tower 12, and a rotor hub 16 provided at the nacelle 14. First and second partial pitch rotor blades 18, 20 are provided on opposite sides of the rotor hub 16. In FIG. 2, the tower 12 is shown provided on a wind turbine base 22, which may comprise any suitable wind turbine foundation. It will be understood that while the illustrated embodiment describes the use of the invention for an on-shore wind turbine, the invention may equally apply to wind turbines for use in an off-shore environment.

The first and second partial pitch rotor blades 18, 20 each comprise a blade body having a root end 18a, 20a mounted to the rotor hub 16 and a distal tip end 18b, 20b. The rotor blades 18, 20 comprise respective inner blade sections 24, 26 provided at the root ends 18a, 20a, and respective outer blade sections 28, 30 provided at the tip ends 18b, 20b. The rotor blades 18, 20 further comprise a pitch system (not shown in FIG. 2) provided in contact with each blade at the junction between the inner blade sections 24, 26 and the outer blade sections 28, 30.

The pitch system is operable to pitch the outer blade sections 28, 30 relative to the inner blade sections 24, 26. In FIG. 2, the rotor blades 18 are shown unpitched (i.e. the outer blade sections 28, 30 are pitched at a 0 degree pitch angle). It will be understood that the inner blade sections 24, 26 and the outer blade sections 28, 30 comprise a substantially circular end section for coupling to corresponding circular pitch systems.

Figure 3:
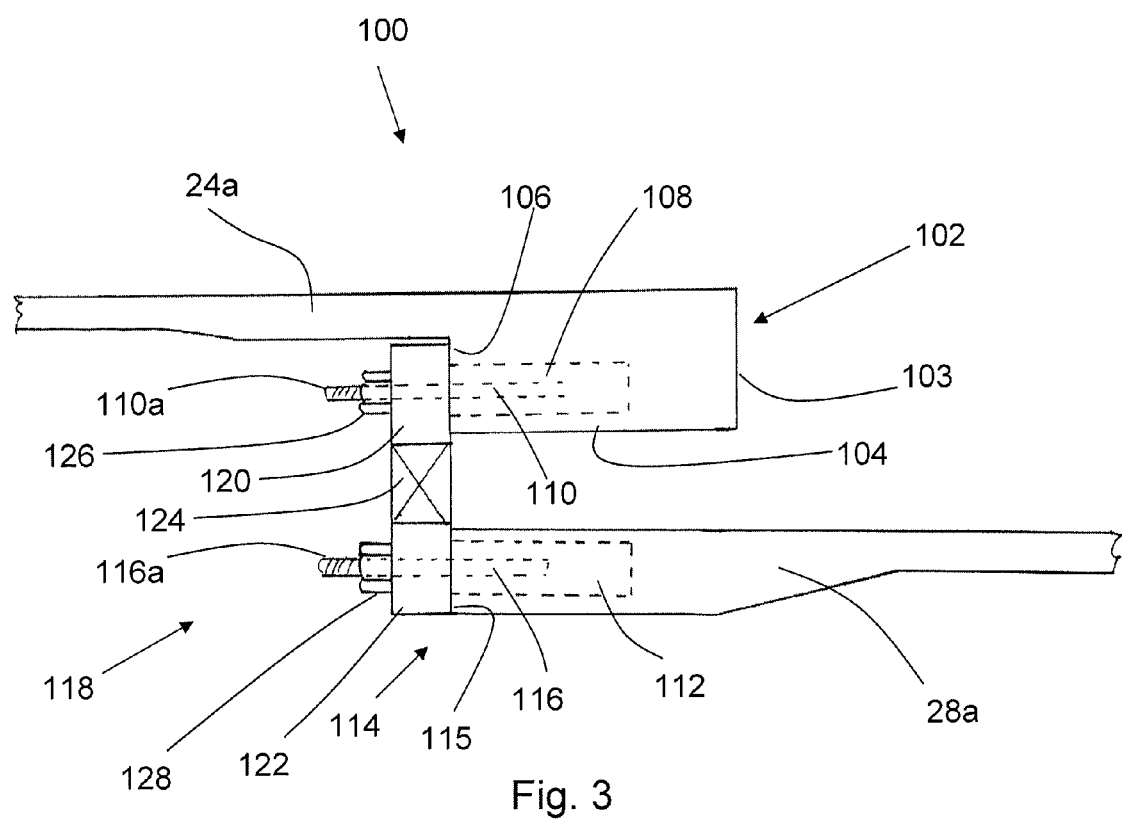
FIG. 3 is an enlarged cross-sectional view of a pitch junction coupling according to a first embodiment of the invention.

With reference to FIG. 3, a first embodiment of a pitch junction coupling, which is found at the junction between the inner blade section 24 (or 26) and the outer blade section 28 (or 30), is indicated generally at 100 (in FIG. 3, the coupling is shown for the inner and outer blade sections 24a, 28a). In this embodiment, the pitch end (indicated at 102) of the inner blade section 24a comprises an internal flange or shoulder 104, which extends around the internal circumference of the pitch end 102, having an external end surface 103. The flange 104 presents an internal bearing surface 106, which is provided on the interior of the blade body. A series of blind holes (indicated in outline at 108) are defined in the internal flange 104, the blind holes 108 open on the internal bearing surface 106. A first plurality of bolts 110 are securely received within the blind holes 108, a free threaded end 110a of the first plurality of bolts 110 projecting clear of the internal bearing surface 106, into the interior of the inner blade section 24a.

In the outer blade section 28a, a further series of blind holes 112 are defined in the end surface 115 of the pitch end (indicated at 114) of the section. A second plurality of bolts 116 are securely received within the blind holes 112, a free threaded end 116a of the second plurality of bolts 116 projecting clear of the pitch end surface 115 of the outer blade section 28a.

The pitch junction coupling 100 further comprises a pitch system 118 comprising a first outer pitch ring 120 and a second inner pitch ring 122 coupled together via at least one bearing runway 124. The first and second pitch rings 120,122 are concentric, with the first outer pitch ring 120 having a greater diameter than the second inner pitch ring 122. The second inner pitch ring 122 is operable to rotate or pitch within the diameter of the first outer pitch ring 120. The first and second pitch rings 120,122 are provided with a series of apertures (not shown) for coupling with a plurality of bolts for mounting.

The pitch system 118 is configured such that the outer pitch ring 120 has an outer diameter substantially equal to the internal unflanged diameter of the inner blade section 24a adjacent the pitch end 102, and the internal flange 104 is arranged to extend from the internal unflanged surface of the inner blade section 24a such that the flange 104 presents a circular structure at the pitch end 102 corresponding to the outline of the first outer pitch ring 106. Accordingly, the internal flange 104 extends from the internal surface of the inner blade section 24a to present an opening at the pitch end 102 of the inner blade section 24a having a smaller diameter than the first outer pitch ring 120.

The pitch system 118 is arranged such that the first pitch ring 120 is coupled with the first plurality of bolts 110 provided at the pitch end surface 106 of the inner blade section 24a, and that the second pitch ring 122 is coupled with the second plurality of bolts 116 provided at the pitch end surface 115 of the outer blade section 28a.

As the diameter of the opening at the pitch end 102 of the inner blade section is smaller than the outer diameter of the pitch system 118, if the pitch system 118 is provided as a single unitary device this may involve transporting the pitch system up through the interior of the inner blade section 24a into position against the inner bearing surface 106 at the pitch end 102 of the inner blade section 24a. Alternatively, if the pitch system 118 can be provided in at least two parts for assembly, the pitch system 118 can be positioned in the interior of the inner blade section 24a by transportation in sections through the open pitch end 102, and subsequent reassembly within the interior of the inner blade section 24a.

Once the pitch system 118 is in position coupled with the bolts 110,116, a first plurality of nuts 126 are provided on the threaded free end 110a of the first plurality of bolts 110, and a second plurality of nuts 128 are provided on the threaded free end 116a of the second plurality of bolts 116. The first set of nuts 126 can be tightened against the first pitch ring 120 and subsequently against the internal bearing surface 106, while the second set of nuts 128 can be tightened against the second pitch ring 122 and subsequently against the pitch end surface 115 of the outer blade section 28a. This secures the pitch system 118 against both the inner blade section 24a and the outer blade section 28a, allowing the blade sections to be pitched relative to one another.

By positioning the flange 104 at the pitch end 102 of the inner blade section 24a, an internal bearing surface 106 is presented on the interior of the blade, against which the first set of nuts 126 and corresponding bolts 110 can be tightened (i.e. clamping the first pitch ring 120 against the surface 106). As this tightening action can be performed from the interior of the blade, accordingly the need for relatively complicated tightening maintenance operations being performed from the blade exterior is removed, and the corresponding maintenance costs for the blade reduced. The second set of nuts 128 may be tightened against the internal surface provided by the pitch end surface 115 of the outer blade section 28d (i.e. clamping the second pitch ring 122 against the surface 115). Alternatively, the bolt/nut combination can be substituted by a bolt with a head that can be turned from inside the blade, although this embodiment is typically not favoured.

While the embodiment shown in FIG. 3 uses blind holes 108 provided on the inner bearing surface 106 of the internal flange 104, it will be understood that other embodiments may be implemented. For example, a series of through-going apertures may be defined in the internal flange 104, the apertures extending from the inner bearing surface 106 to the external end surface 103 of the flange 104 provided at the pitch end 102 of the inner blade section 24a. In such an embodiment, the bolts 110 shown in FIG. 3 may be replaced with a plurality of bolts having a bolt head and a threaded free end, the bolts arranged in the apertures such that the bolt heads are provided on the exterior of the blade, acting against the external end surface 103 of the flange 104 provided at the pitch end 102 of the inner blade section 24a, and such that the threaded free ends of the bolts are provided on the interior of the blade, as with the free ends 110a of the bolts 110 shown in FIG. 3. Accordingly, the nuts in this embodiment may be also tightened against the inner bearing surface 106 of the flange 104, allowing for the necessary tightening operations to be performed from the interior of the blade. In this case, the bolt head advantageously is self-securing against the exterior surface in order to avoid the need of fastening actions from the exterior of the blade.

Figure 4A:
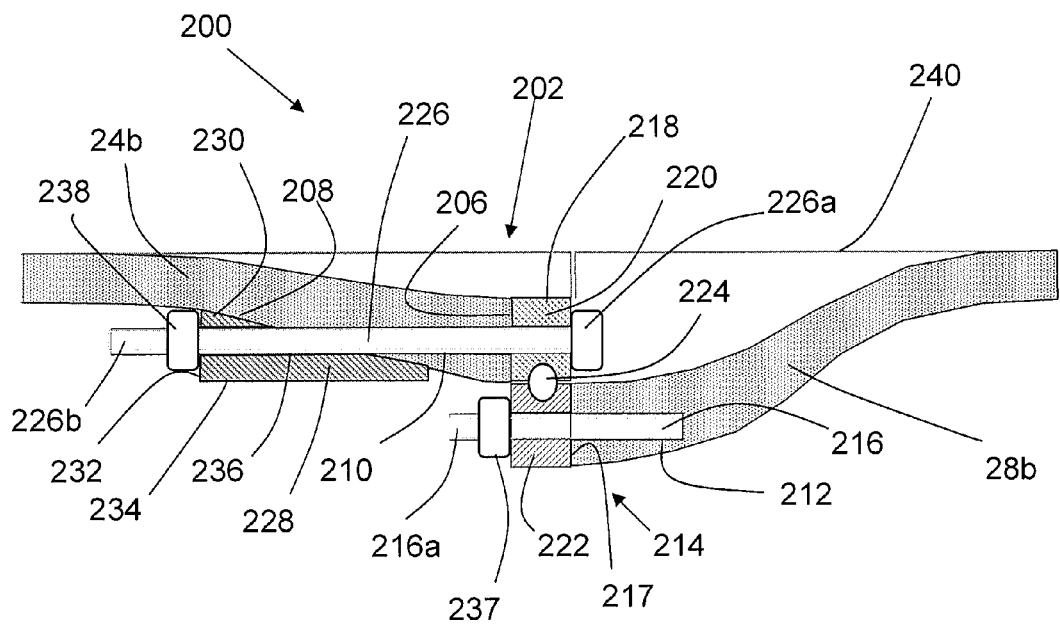
FIGS. 4(a) and 4(b) show enlarged cross-sectional views of two types of pitch junction coupling according to a second embodiment of the invention.
Figure 4B:
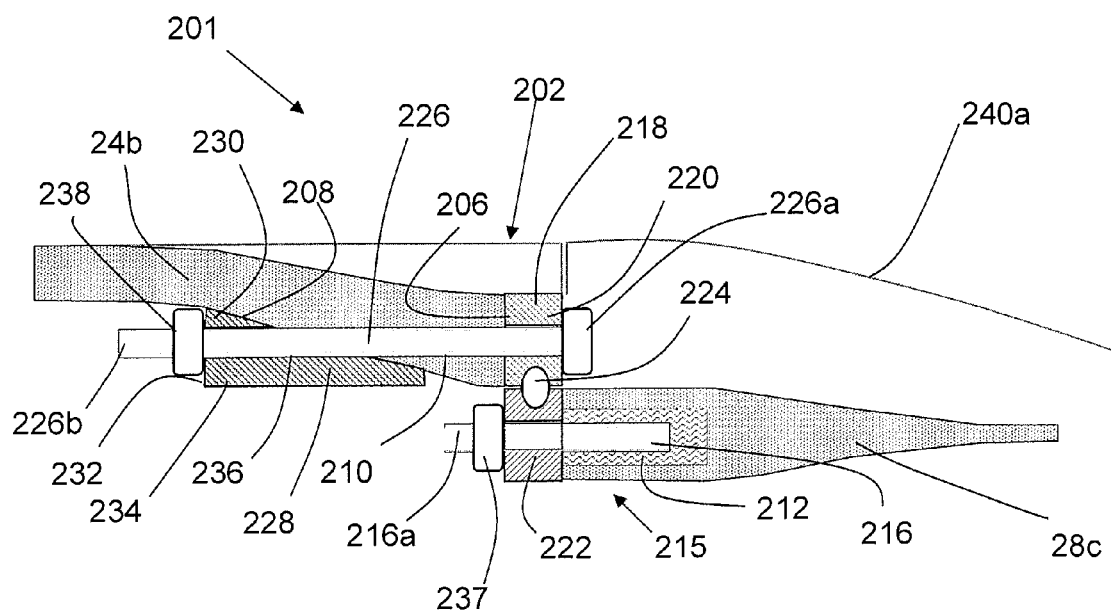

FIGS. 4(a) and 4(b) illustrate optional embodiments utilising through going apertures in the flange instead of blind holes. By using through-going apertures, pitch system 118 may be mounted to the external end surface 103 of the flange 104 provided at the pitch end 102 of the inner blade section 24a, i.e. the first outer pitch ring 120 effectively clamped between the bolt heads of the set of bolts used, and the external surface 103 of the flange 104, while the tightening operation is performed on the internally-located nuts. This configuration means that the pitch system 118 need not be transported through the interior of the inner blade section 24a from the root end of the blade for positioning in place for mounting, which is an advantage.

In the embodiment of FIG. 4(a), a pitch junction coupling, provided at the junction between the inner blade section 24 (or 26) and the outer blade section 28 (or 30), is indicated generally at 200 (in FIG. 4(a), the coupling is shown for the inner and outer blade sections 24b,28b). In this pitch junction coupling 200, the inner blade section 24b is tapered or narrowed to a relatively narrow pitch end (indicated at 202) of the inner blade section 24b, the pitch end 202 presenting a level end surface 206 of the inner blade section 24b. The tapering or narrowing of the inner blade section 24b at the pitch end presents an inclined internal bearing surface 208 of the inner blade section 24b. A plurality of through-going apertures 210 are defined at the pitch end 202 of the inner blade section 24b, the apertures 210 extending from the level end surface 206 to the inclined internal bearing surface 208.

In the embodiment of FIG. 4(a), the outer blade section 28b is tapered or narrowed at the pitch end (indicated at 214) of the outer blade section 28b, to a relatively narrow pitch end 214 having a level end surface 217, which has a smaller diameter than the pitch end 202 of the inner blade section 24b.

In the outer blade section 28b, a series of blind holes 212 are defined in the end surface 217 of the pitch end 214 of the section 28b. A first plurality of bolts 216 are securely received within the blind holes 212, a free threaded end 216a of the second plurality of bolts 216 projecting clear of the pitch end 214 of the outer blade section 28b.

The pitch junction coupling 200 further comprises a pitch system 218 comprising a first outer pitch ring 220 and a second inner pitch ring 222 coupled together via at least one bearing runway 224. The first and second pitch rings 220,222 are concentric, with the first outer pitch ring 220 having a greater diameter than the second inner pitch ring 222. The second inner pitch ring 222 is operable to rotate or pitch within the diameter of the first outer pitch ring 220. The first and second pitch rings 220,222 are provided with a series of apertures (not shown) for coupling with a plurality of bolts for mounting.

The pitch system 218 is configured such that the first outer pitch ring 220 has a diameter substantially equivalent to the diameter of the relatively narrow pitch end 202 of the inner blade section 24b, such that the outer pitch ring 220 of the pitch system 218 may be positioned in register with the level end surface 206 of the inner blade section 24b. The pitch system 218 is further configured such that the second inner pitch ring 222 has a diameter substantially equivalent to the diameter of the pitch end 214 of the outer blade section 28b, such that the inner pitch ring of the pitch system 218 may be positioned in register with the end surface 217 of the pitch end 214 of the outer blade section 28b.

The pitch system 218 is arranged such that the second inner pitch ring 222 abuts the end surface 217 of the pitch end 214 of the outer blade section 28b, the second pitch ring 222 coupled with the first plurality of bolts 216 the outer blade section 28b. The pitch system 218 is further arranged such that the first outer pitch ring 220 abuts the level end surface 206 of the inner blade section 24b, wherein the plurality of apertures defined on the first outer pitch ring 220 are aligned with the plurality of through-going apertures 210 defined on the end surface 206.

A plurality of headed bolts 226 are provided extending through the plurality of apertures defined on the first outer pitch ring 220 and the plurality of through-going apertures 210 defined on the end surface 206. The bolts 226 are arranged such that the head end 226a of the bolts abuts the first outer pitch ring 220 of the pitch system 218, the free threaded end 226b of the bolts 226 extending into the interior of the inner blade section 24b.

In order to provide a level internal bearing surface for securing the plurality of headed bolts 226 in position, the coupling further comprises a bolting collar 228, provided at the interior of the inner blade section 24b. The bolting collar 228 comprises a circular collar body having a substantially wedge-shaped cross-section, presenting a first inclined surface 230 and a pair of level surfaces 232,234. A series of through-going apertures 236 extend from the inclined surface 230 through the bolting collar 228 to a first of the level surfaces 232.

The bolting collar 228 is positioned such that the first inclined surface 230 of the bolting collar 228 abuts the inclined internal bearing surface 208 of the inner blade section, wherein the apertures 236 of the bolting collar 228 are in register with the plurality of through-going apertures 210 defined on the end surface 206 of the inner blade section 24b. Accordingly, the headed bolts 226 extend through the apertures 236 of the bolting collar 228, such that the free threaded ends 226b of the bolts 226 project clear of the first level surface 232 of the bolting collar 228.

To secure the pitch system coupling 200, a first plurality of nuts 237 are provided on the threaded free end 216a of the first plurality of bolts 216, and a second plurality of nuts 238 are provided on the threaded free end 226b of the plurality of headed bolts 226. The first set of nuts 237 can be tightened against the second inner pitch ring 222 and subsequently against the end surface 217 of the pitch end 214 of the outer blade section 28b, to secure the second pitch ring 222 against the end surface 217.

Similarly, the second set of nuts 238 can be tightened against the first level surface 232 of the bolting collar 228, which provides a level internal bearing surface for the headed bolts 226. Tightening the second set of nuts 238 against the bolting collar 228 will tighten the collar 228 against the inclined internal bearing surface 208 of the inner blade section 24b, with the clamping force subsequently transferred through the structure such that tightening the nuts acts to tighten the head end 226a of the bolts 226 against the first outer pitch ring 220, clamping the pitch ring 220 against the level end surface 206 at the pitch end 202 of the inner blade section 24b.

This secures the pitch system 218 against both the inner blade section 24b and the outer blade section 28b, allowing the blade sections to be pitched relative to one another. As the inclined internal bearing surface 208 presents a difficult surface to effectively tighten a nut against, the use of the wedge-shaped bolting collar 228 provides a level bearing surface on the interior of the inner blade section 24b, against which the bolts 226 can be tightened. This in turn allows for the internal tightening of the pitch system coupling 200, eliminating the requirement for relatively complicated tightening maintenance operations being performed from the blade exterior.

In order to reduce aerodynamic losses in the region of the pitch system coupling 200, at least one shell or aerodynamic fairing 240 may be provided at the pitch junction, the shell arranged to cover the relatively tapered pitch ends 202,214 of the inner and outer blade section 24b,28b. The shell 240 may be provided in two sections—a first section for the pitch end 202 of the inner blade section 24b and a second section for the pitch end 214 of the outer blade section 28b—such that the shell structure 240 may be pitched as the outer blade section 28b is pitched relative to the inner blade section 24b. The shell 240 is shaped to provide a consistent aerodynamic blade profile at the pitch junction, and to prevent the occurrence of vortex or tip losses at the pitch junction due to the shape of the pitch system coupling 200.

It will be understood that other pitch system coupling constructions may be used. For example, with reference to FIG. 4(b), an alternate pitch system coupling is indicated at 201, between an inner blade section 24b and an outer blade section 28c. (For the purpose of simplicity, components of the pitch system coupling 201 of FIG. 4(b) having equivalent components in the pitch system coupling 200 of FIG. 4(a) have been given the same reference numerals, and are not described in particular reference to this embodiment.) In the example of FIG. 4(b), the outer blade section 28c does not comprise a relatively narrowed pitch end 214 as in FIG. 4(a). Rather, the outer blade section 28c is substantially untapered at pitch end, and comprises a pitch end 215 having the same diameter as the second inner pitch ring 222 of the pitch system 218. This construction results in a relatively large jump or discontinuity between the aerodynamic profile of the inner blade section 24 and the aerodynamic profile of the outer blade section 28c.

In this construction, the blade may comprise a shell or fairing 240a which acts to bridge the gap between the two blade profiles, providing a relatively consistent aerodynamic blade profile for the entire length of the blade in the region of the pitch junction.

Figure 5:
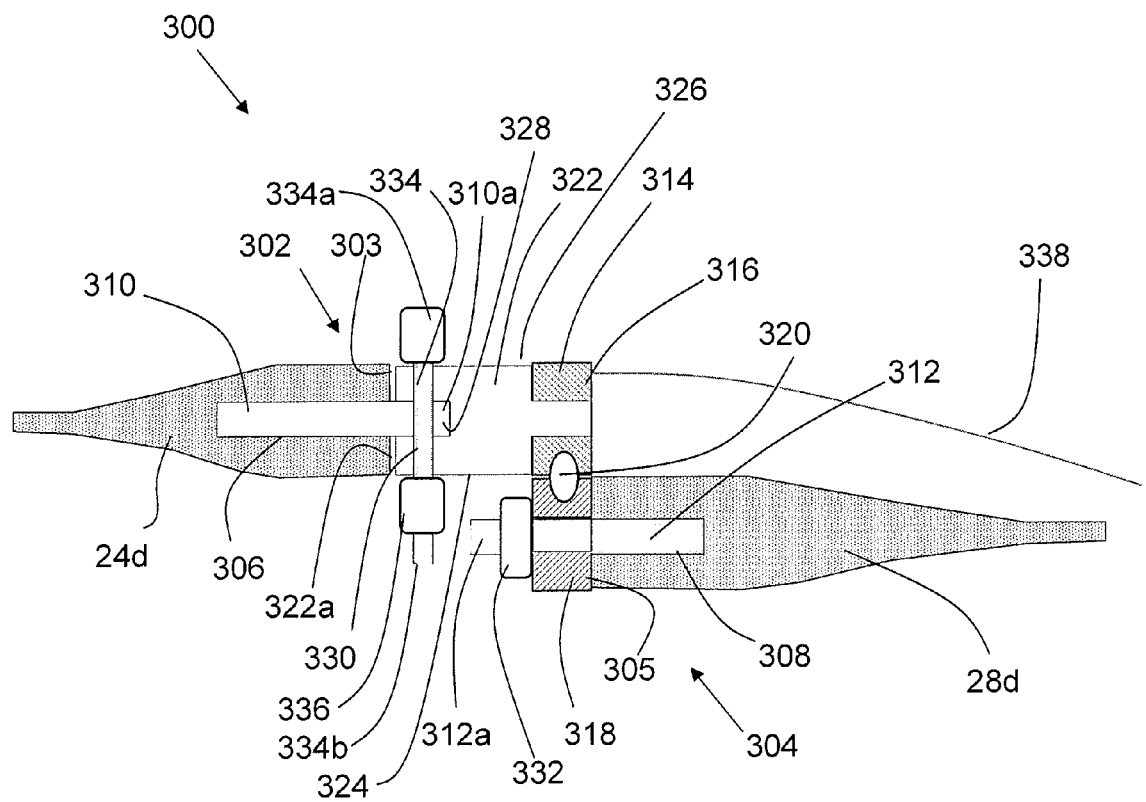
FIG. 5 is an enlarged cross-sectional view of a pitch junction coupling according to a third embodiment of the invention.

With reference to FIG. 5, a further alternative embodiment of the invention is illustrated. A pitch junction coupling, provided at the junction between the inner blade section 24 (or 26) and the outer blade section 28 (or 30), is indicated generally at 300. (In FIG. 5, the coupling is shown in relation to the inner and outer blade sections 24d, 28d.) In this embodiment of pitch junction coupling 300, the inner and outer blade sections 24d,28d are untapered at the pitch junction, the pitch end 302 of the inner blade section 24d having a relatively larger diameter than the pitch end 304 of the outer blade section 28d.

A first plurality of blind holes 306 are defined in the end surface 303 of the pitch end 302 of the inner blade section 24d, and a second plurality of blind holes 308 are defined in the end surface 305 of the pitch end 304 of the outer blade section 28d.

A plurality of coupling anchors 310 are securely received within the first plurality of blind holes 306 provided on the pitch end 302 end surface 303 of the inner blade section 24b. The anchors 310 comprise a free end 310a projecting from the end surface 303 of the pitch end 302, each anchor 310 having a through-going hole (not shown) defined in the free end 310a of the anchors 310, each of the holes open towards the central longitudinal axis of the inner blade section 24d.

A plurality of bolts 312 are securely received within the second plurality of blind holes 308 provided on the pitch end 302 end surface 305 of the inner blade section 24d, a free threaded end 312a of the plurality of bolts 312 projecting clear of the surface 305 of the pitch end 304 of the outer blade section 28d.

The pitch junction coupling 300 further comprises a pitch system 314 comprising a first outer pitch ring 316 and a second inner pitch ring 318 coupled together via at least one bearing runway 320. The first and second pitch rings 316,318 are concentric, with the first outer pitch ring 316 having a greater diameter than the second inner pitch ring 318. The second inner pitch ring 318 is operable to rotate or pitch within the diameter of the first outer pitch ring 316.

The second pitch ring 318 is provided with a series of through-going apertures (not shown) for coupling with a plurality of bolts for mounting.

The pitch system 314 further comprises a circular bolting collar or flange 322 projecting from the first outer pitch ring 316 to a first end 322a, the bolting collar 322 having an inner surface 324 facing towards the central longitudinal axis which passes through the centre of the pitch system 314 and an outer surface 326 facing away from the central longitudinal axis.

A series of blind holes 328 are defined on the end surface of the free end 322a of the bolting collar 322, the bolting collar 322 further comprising a corresponding series of through-going apertures 330 extending from the outer surface 326 to the inner surface 324, the through-going apertures 330 orthogonal to the blind holes 328. The through-going apertures 330 are arranged such that each one of the apertures 330 intersects one of the series of blind holes 328.

The pitch system 314 is configured such that the first outer pitch ring 316 and the bolting collar 322 have a diameter substantially equivalent to the diameter of the pitch end 302 of the inner blade section 24d. Accordingly, the free end 322a of the bolting collar 322 may be positioned in register with the end surface 303 of the pitch end 302 of the inner blade section 24d, the free ends 310a of the coupling anchors 310 received within the blind holes 328 provided on the bolting collar 322.

The pitch system 314 is further configured such that the second inner pitch ring 318 has a diameter substantially equivalent to the diameter of the pitch end 304 of the outer blade section 28d, such that the inner pitch ring 318 of the pitch system 314 may be positioned in register with the end surface 305 of the pitch end 304 of the outer blade section 28d, the free ends 312a of the bolts 312 projecting from the pitch end 304 of the outer blade section 28d extending through the apertures provided on the second inner pitch ring 318.

A plurality of nuts 332 are applied to the threaded free end 312a of the second plurality of bolts 312, the nuts 332 tightened against the second inner pitch ring 318 to secure the pitch system 314 to the outer blade section 28d.

To secure the pitch system 314 to the inner blade section 24d, a series of headed bolts 334 are passed through the through-going apertures 330 of the bolting collar 322, the bolts 334 coupling with the holes provided in the free ends 310a of the coupling anchors 310. The headed bolts 334 comprise a head end 334a and a threaded free end 334b. The bolts 334 are arranged such that the bolt 334 is passed through the aperture 330 from the exterior of the blade, such that the head end 334a bears against the outer surface 326 of the bolting collar 322, and the threaded free end 334b projects clear of the inner surface 324 of the collar 322.

A series of nuts 336 are provided on the threaded free ends 334b of the bolts 334, the nuts 336 operable to be tightened against the inner surface 324 of the bolting collar 322. Tightening the nuts 336 against the inner surface 324 acts to secure the bolts 334 in position on the bolting collar 322, which in turn secures the first outer ring 316 of the pitch system 314 to the pitch end 302 of the inner blade section 24d, as the bolts 334 intersect the coupling anchors 310 which project from the inner blade section 24d.

While the bolts 334 provided in the bolting collar 322 are substantially orthogonal to the bolts 312 provided in the pitch end 304 of the outer blade section 28d, resulting in a cross-bolt-type coupling, the nuts 336,332 applied to each set of bolts 334,312 may be tightened against an internal bearing surface (i.e. the inner surface 324 of the bolting collar 322; and the second pitch ring 318 and end surface 305 of the pitch end 304 of the outer blade section 28d respectively). In this manner, the bolts 312,334 securing the pitch system 314 to the inner and outer blade section 24d,28d may be tightened from the interior of the blade, providing for more efficient and cost effective maintenance operations. Especially, the bolts 334 may be tapered such that tightening the nuts 336 pulls a tapered part of the bolts 334 through the through-going hole (not shown) defined in the free end 310a of the anchors 310 and thereby draws the inner blade section 24d towards the bolting collar 322.

It will be understood that, as with the previous embodiments, the coupling may also comprise a suitable shell or fairing 338 provided at the pitch junction, in order to provide a relatively smooth transition in the blade aerodynamic profile from the inner blade section 24d to the outer blade section 28d.

It will be understood that variations of this embodiment may be foreseen, for example the coupling anchors 310 may be replaced by a single unitary coupling collar which extends around the circumference of the pitch end 302 of the inner blade section 24d, such a coupling collar being received within a corresponding channel defined about the circumference of the bolting collar 322. Additionally or alternatively, while the embodiment of FIG. 5 illustrated the coupling anchors 310 being received within holes 322 provided in the body of the bolting collar 328, it will be understood that the bolting collar 322 may be dimensioned to fit around the outside of the periphery of the circle defined by the coupling anchors 310, or within the circle, or the anchors 310 may be dimensioned to receive at least one projection provided on the end surface 322a of the collar 322 within a suitable channel defined on the anchors 310.

An advantage of this embodiment is that the novel coupling technique may be applied without substantial modification to existing blade designs, as it is the pitch system which is modified with the addition of the bolting collar. Furthermore, while the bolting collar may be provided as an integral part of the pitch system, it will be understood that existing pitch systems may be relatively easily modified by affixing a suitable bolting collar to at least one of the pitch rings of the pitch system.

The adaptation of the pitch coupling sections of the partial pitch wind turbine blade to provide first and second internal bearing surfaces for the bolts of the coupling section allows for the bolts to be tightened from the interior of the blade. This eliminates the requirement for relatively complicated external tightening operations which should be performed at regular intervals, reducing the effort and associated costs involved in such maintenance of partial pitch wind turbines.

The invention is not limited to the embodiments described herein, and may be modified or adapted without departing from the scope of the present invention.

In the following, some of the embodiments are described in the form of interdependent aspects.

ASPECTS

Aspect 1. A partial pitch wind turbine blade of at least 35 metres length having a substantially hollow body, the blade comprising:

a pitch system having first and second pitch rings, the second pitch ring rotatable relative to the first pitch ring;

an inner blade section having a root end and a pitch end, the pitch end of the inner blade section coupled to the first pitch ring of the pitch system by a first plurality of bolts; and an outer blade section having a pitch end and a tip end, the pitch end of the outer blade section coupled to the second pitch ring of the pitch system by a second plurality of bolts, the outer blade section pitchable relative to the inner blade section, wherein the blade presents a first bearing surface and a second bearing surface provided on the interior of the blade body, the blade arranged such that a first end of the first plurality of bolts and a first end of the second plurality of bolts are accessible from the interior of the wind turbine blade, wherein the first plurality of bolts may be tightened against the first bearing surface and the second plurality of bolts may be tightened against the second bearing surface, such that the first and second plurality of bolts may be tightened from the interior of the wind turbine blade body.

Aspect 2. The blade of aspect 1, wherein the pitch end of the inner blade section is shaped to present the first bearing surface against which an end of the bolts of the first plurality may be tightened.

Aspect 3. The blade of aspect 2, wherein the inner blade section comprises an inner flange provided at the pitch end of the inner blade section, and wherein the first pitch ring of the pitch system is bolted to the inner flange.

Aspect 4. The blade of aspect 3, wherein the blade comprises a plurality of blind holes provided in the inner flange, the blind holes extending from an inner bearing surface of the inner flange into the wind turbine blade body at the flange, the first plurality of bolts extending through the first pitch ring into the blind holes, wherein the first plurality of bolts are operable to be tightened against the first pitch ring to secure the first pitch ring to the inner bearing surface of the inner flange.

Aspect 5. The blade of aspect 3, wherein the blade comprises a plurality of through-going apertures provided in the inner flange, the apertures extending from an inner bearing surface of the inner flange to an outer surface of the inner flange, wherein the first plurality of bolts extend through the apertures of the inner flange and the first pitch ring to mount the first pitch ring to the inner flange, such that an end of the first plurality of bolts may be tightened against the inner bearing surface of the inner flange to secure the first pitch ring to the inner flange.

Aspect 6. The blade of aspect 2, wherein the inner blade section is tapered at the pitch end to provide an inclined inner wall at the pitch end, wherein the first pitch ring is mounted to the end surface of the substantially hollow wind turbine blade body at the pitch end of the inner blade section, and wherein the first plurality of bolts are adapted to be tightened against the inclined inner wall.

Aspect 7. The blade of aspect 6, wherein the blade further comprises a bolting collar, the bolting collar having a substantially wedge-shaped cross-section having an inclined surface, wherein the inclined surface of the bolting collar is adapted to abut the inclined inner wall of the pitch end of the inner blade section, and wherein the bolting collar presents a level interior bearing surface against which an end of the bolts of the first plurality may be tightened.

Aspect 8. The blade of aspect 1, wherein the pitch system comprises a circular bolting collar projecting from the first pitch ring, the circular bolting collar adapted to couple with the pitch end of the inner blade section, wherein the circular bolting collar presents a collar internal bearing surface, the first plurality of bolts arranged to be tightened against the collar internal bearing surface to secure the first pitch ring to the pitch end of the inner blade section.

Aspect 9. The blade of aspect 8, wherein the blade comprises at least one coupling projection provided at the pitch end of the inner blade section, the circular bolting collar arranged to couple with the at least one coupling projection, and wherein the first plurality of bolts are arranged to extend through the circular bolting collar and the at least one coupling projection to form a bolted joint to secure the first pitch ring to the pitch end of the inner blade section.

Aspect 10. A partial pitch wind turbine comprising a partial pitch wind turbine blade according to any preceding aspect.

What is claimed is:

1. A method for mounting a pitch system in a partial pitch wind turbine blade (18, 20) of at least 35 metres length, the blade (18, 20) having a substantially hollow blade body with an inner blade section (24, 26) and outer blade section (28, 30) between which there is provided a pitch system for pitching the outer blade section (28, 30) relative to the inner blade section (24, 26); characterised in that the method comprises fastening the inner blade section (24, 26) to the pitch system by a fastening action performed only from inside the hollow blade body.

2. The method according to claim 1,
wherein the pitch system comprises first (120) and second (122) pitch rings, the second pitch ring (122) rotatable relative to the first pitch ring (120);
wherein the blade comprises an inner blade section (24, 26) having a root end (18a, 20a) and a first pitch end (102); the first pitch end (102) being configured for coupling to the first pitch ring (120) by a first plurality of fasteners (110, 126); the first plurality of fasteners (110, 126) having first means (126) for securing the first plurality of fasteners (110, 126), the first means (126) being configured such that securing of the first means (126) fastens the first pitch end (102) to the first pitch ring (120); and
wherein the blade further comprises an outer blade section (28, 30) having a second pitch end (114) and a tip end (18b, 20b); the second pitch end (114) being configured for coupling to the second pitch ring (122) of the pitch system by a second plurality of fasteners (116, 128); the second plurality of fasteners (116, 128) having second means (128) for securing the second plurality of fasteners (116, 128), the second means (128) being configured such that securing of the second means (128) fastens the second pitch end (114) to the second pitch ring (122);
wherein the second means (128) are only accessible from an interior of the wind turbine blade (18, 20);
wherein the outer blade section (28, 30) is pitchable relative to the inner blade section (24, 26) by rotating the second pitch ring (122) relatively to the first pitch ring (120);
wherein the method comprises fastening the second pitch end (114) to the second pitch ring by securing said second means (126) only from the interior of said wind turbine blade (18, 20);
wherein the method comprises fastening the first pitch end (102) to the first pitch ring (120) by securing said first means (116) only from the interior of said wind turbine blade (18, 20).

3. The method of claim 2, wherein the first pitch end (102) comprises a first bearing surface (106) on an interior of the inner blade section (24, 26), wherein the method comprises abutting the first bearing surface (106) against the first pitch ring (120) and fastening it by securing the first means (126).

4. The method of claim 3, wherein the first plurality of fasteners (110, 126) comprises first bolts (110) and first nuts (126), and wherein the first means are the first nuts (126); wherein the first bolts (110) extend through the first pitch ring (120) and into the first pitch end (102); and wherein the first means (126) and the first bearing surface (106) are provided on opposite sides of the first pitch ring (102) for clamping the first pitch ring (120) against the first bearing surface (106).

5. The method of claim 2, wherein the first plurality of fasteners (110, 126) comprises first bolts (110) and first nuts (126), and wherein the first means are the first nuts (126); wherein the second plurality of fasteners (116, 128) comprises second bolts (116) and second nuts (128), and wherein the second means are the second nuts (128), wherein the securing of the first means (126) and second means (128) comprises tightening the first and second nuts, respectively.

6. A partial pitch wind turbine blade (18, 20) of at least 35 metres length, the blade (18, 20) having a substantially hollow blade body, the blade comprising:
a pitch system having first (120) and second (122) pitch rings, the second pitch ring (122) being rotatable relative to the first pitch ring (120);
an inner blade section (24, 26) having a root end (18a, 20a) and a first pitch end (102); the first pitch end (102) of the inner blade section (24, 26) being coupled to the first pitch ring (120) by a first plurality of fasteners (110,

126); the first plurality of fasteners (110, 126) having first means (126) for securing the first plurality of fasteners (110, 126), the first means (126) being configured such that securing of the first means (126) fastens the inner blade section (24, 26) to the first pitch ring (120); and an outer blade section (28, 30) having a second pitch end (114) and a tip end (18b, 20b); the second pitch end (114) of the outer blade section (28, 30) being coupled to the second pitch ring (122) of the pitch system by a second plurality of fasteners (116, 128); the second plurality of fasteners (116, 128) having second means (128) for securing the second plurality of fasteners (116, 128), the second means (128) being configured such that a securing of the second means (128) fastens the inner blade section (24, 26) to the second pitch ring (122); wherein the second means (128) are only accessible from an interior of the wind turbine blade (18, 20);

wherein the outer blade section (28, 30) is pitchable relative to the inner blade section (24, 26) by rotating the second pitch ring (122) relatively to the first pitch ring (120);

characterised in that the blade is configured for fastening the inner blade section (24, 26) to the first pitch (120) ring only by securing the first means (126), and wherein the first means (126) are accessible only from the interior of the wind turbine blade (18, 20).

7. The blade of claim 6, wherein the first pitch end (102) comprises a first bearing surface (106) on an interior of the inner blade section (24, 26), wherein the first bearing surface (106) abuts the first pitch ring (120) and is fastened to it by the first fasteners (110, 126).

8. The blade of claim 7, wherein the first pitch end (102) has an inner flange (104), the inner flange (104) comprising the first bearing surface (106), and wherein the first pitch ring (120) of the pitch system is fastened to the first bearing surface (106) of the inner flange (104) by the first plurality of fasteners (110, 126).

9. The blade of claim 8, wherein the first plurality of fasteners (110, 126) comprises first bolts (110) and first nuts (126), and wherein the first means are the first nuts (126); wherein the first means (126) and the first bearing surface (106) are provided on opposite sides of the first pitch ring (102) for clamping the first pitch ring (120) against the first bearing surface (106); wherein the inner flange (104) comprises a plurality of blind holes (108) extending from the first bearing surface (106) of the inner flange (104) into the wind turbine blade body at the inner flange (104), wherein the first bolts (110) extend through the first pitch ring (120) into the blind holes (108).

10. The blade of claim 8, wherein the first plurality of fasteners (110, 126) comprises first bolts (110) and first nuts (126), and wherein the first means are the first nuts (126); wherein the first bolts (110) extend through the first pitch ring (120) and into the first pitch end (102); and wherein the first means (126) and the first bearing surface (106) are provided on opposite sides of the first pitch ring (102) for clamping the first pitch ring (120) against the first bearing surface (106).

11. The blade of claim 7, wherein the first bearing surface (106) is orthogonal to a longitudinal axis of the inner blade section (24, 26).

12. The blade of claim 11, wherein the first plurality of fasteners (110, 126) comprises first bolts (110) and first nuts (126), and wherein the first means are the first nuts (126); wherein the first bolts (110) extend through the first pitch ring (120) and into the first pitch end (102); and wherein the first means (126) and the first bearing surface (106) are provided on opposite sides of the first pitch ring (102) for clamping the first pitch ring (120) against the first bearing surface (106).

13. The blade of claim 7, wherein the first plurality of fasteners (110, 126) comprises first bolts (110) and first nuts (126), and wherein the first means are the first nuts (126); wherein the first bolts (110) extend through the first pitch ring (120) and into the first pitch end (102); and wherein the first means (126) and the first bearing surface (106) are provided on opposite sides of the first pitch ring (102) for clamping the first pitch ring (120) against the first bearing surface (106).

14. The blade of claim 6, wherein the first plurality of fasteners (110, 126) comprises first bolts (110) and first nuts (126), and wherein the first means are the first nuts (116); wherein the second plurality of fasteners (116, 128) comprises second bolts (116) and second nuts (128), and wherein the second means are the second nuts (128).

\* \* \* \* \*